(12) United States Patent
Chhabra et al.

(10) Patent No.: US 11,593,669 B1
(45) Date of Patent: Feb. 28, 2023

(54) SYSTEMS, METHODS, AND APPARATUSES FOR DETECTING AND CREATING OPERATION INCIDENTS

(71) Applicant: Amazon Technologies, Inc., Seattle, WA (US)

(72) Inventors: Jasmeet Chhabra, Sammamish, WA (US); Zaid Radi Abu Ziad, Seattle, WA (US); Vikas Dharia, Sammamish, WA (US); Harshad Vasant Kulkarni, Bellevue, WA (US); Khaled Salah Sedky, Sammamish, WA (US); Scott Michael Wiltamuth, Seattle, WA (US); Douglas Allen Walter, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/105,979

(22) Filed: Nov. 27, 2020

(51) Int. Cl.
| | |
|---|---|
| *G06F 11/00* | (2006.01) |
| *G06N 5/022* | (2023.01) |
| *G06F 11/30* | (2006.01) |
| *G06F 11/07* | (2006.01) |
| *G06N 5/045* | (2023.01) |
| *G06F 11/22* | (2006.01) |

(52) U.S. Cl.
CPC ........... *G06N 5/022* (2013.01); *G06F 11/079* (2013.01); *G06F 11/0781* (2013.01); *G06F 11/2257* (2013.01); *G06F 11/301* (2013.01); *G06N 5/045* (2013.01)

(58) Field of Classification Search
CPC ... G06F 11/0781; G06F 11/079; G06F 11/301
See application file for complete search history.

(56) References Cited

U.S. PATENT DOCUMENTS

| | | | |
|---|---|---|---|
| 9,317,829 B2* | 4/2016 | Anand | G06N 7/005 |
| 10,936,395 B1* | 3/2021 | Varma | G06F 16/148 |
| 11,003,641 B2* | 5/2021 | Dundjerski | G06F 11/0757 |
| 11,057,266 B2* | 7/2021 | Jain | H04L 41/0654 |
| 11,269,718 B1* | 3/2022 | Chen | G06F 11/079 |
| 2008/0091454 A1* | 4/2008 | Fisher, Jr. | H04L 12/66 705/301 |
| 2015/0046389 A1* | 2/2015 | Dhayapule | G06F 11/079 707/602 |
| 2016/0300142 A1* | 10/2016 | Feller | G06N 20/00 |
| 2016/0350173 A1* | 12/2016 | Ahad | G06F 11/0751 |

(Continued)

*Primary Examiner* — Elmira Mehrmanesh
(74) *Attorney, Agent, or Firm* — Nicholson De Vos Webster & Elliott LLP

(57) ABSTRACT

Techniques for determining insight are described. An exemplary method includes receiving a request to provide insight into potential abnormal behavior; receiving one or more of anomaly information and event information associated with the potential abnormal behavior; evaluating the received one or more of the anomaly information and event information associated with the abnormal behavior to determine there is insight as to what is causing the potential abnormal behavior and to add to an insight at least two of an indication of a metric involved in the abnormal behavior, a severity for the insight indication, an indication of a relevant event involved in the abnormal behavior, and a recommendation on how to cure the potential abnormal behavior; and providing an insight indication for the generated insight.

20 Claims, 14 Drawing Sheets

(56) References Cited

U.S. PATENT DOCUMENTS

| | | | |
|---|---|---|---|
| 2017/0230229 A1* | 8/2017 | Sasturkar | G06F 16/285 |
| 2017/0277582 A1* | 9/2017 | Chen | G06F 11/079 |
| 2017/0279838 A1* | 9/2017 | Dasgupta | H04L 63/145 |
| 2017/0344926 A1* | 11/2017 | Chakra | G06F 16/2465 |
| 2018/0114234 A1* | 4/2018 | Fighel | G06F 40/253 |
| 2019/0266253 A1* | 8/2019 | Maiti | G06F 16/243 |
| 2019/0361759 A1* | 11/2019 | Haugen | G06F 11/079 |
| 2020/0067948 A1* | 2/2020 | Baradaran | H04L 63/1458 |
| 2020/0241990 A1* | 7/2020 | Gustafson | G06F 11/3082 |
| 2022/0043702 A1* | 2/2022 | Haines | G06F 11/32 |

* cited by examiner

| ID 201 | EVENT/ANOMALIES 203 | SEVERITY 205 | RECOMMENDATION 207 |
|---|---|---|---|
| 1 | MYSQL:DBLOAD:UPPERTHRESHOLD | MEDIUM | RECOMMENDATION 5; RECOMMENDATION 1 |
| 2 | APIGATEWAY:ERRORS:UPPERTHRESHOLD | HIGH | |
| 3 | APIGATEWAY:UPPERTHRESHOLD | LOW | RECOMMENDATION 1 |
| 4 | INFRASTRUCTUREMONITOR:CHECKOUTLATENCY:ALARM | HIGH | |
| 5 | IDENTITY:POLICYCHANGE:REMOVEPERMISSIONS | HIGH | |

*FIG. 2*

| INSIGHT NAME | SEVERITY (HIGH, MED, LOW) |

INSIGHT OVERVIEW 300

| DESCRIPTION 301 | START TIME 305 | AFFECTED ENTITIES 309 |
|---|---|---|
| DESCRIPTION TEXT | DATE TIME | NAMES; LINK TO ENTITIES |
| STATUS 303 | END TIME 307 | |
| RESOLVED; OPEN | DATE TIME | |

AGGREGATED METRICS 310

SEARCH 311

SEARCH TEXT (FIND METRICS BY NAME, SOURCE, STAT, STACK, RESOURCE TYPE)

IMPACTED METRICS 313        TIMELINE OF IMPACT 315

DAY 0   DAY 1   DAY 2   DAY 3   DAY 4

METRIC NAME 1
[STACK   RESOURCE TYPE   RESOURCE       NAME]

METRIC NAME 2
[STACK   RESOURCE TYPE   RESOURCE       NAME]

RELEVANT EVENTS 320

SEARCH 321

SEARCH TEXT (FIND EVENTS BY NAME, STACK, RESOURCE TYPE)

DAY 0   DAY 1   DAY 2   DAY 3   DAY 4

EVENT 323

INSIGHT START     INSIGHT END

RECOMMENDATIONS 330

RECOMMENDATION NAME 331

| TEXT ABOUT WHY RECOMMENDED 333 | RELATED METRICS OR EVENTS 335 |
|---|---|

EXECUTE ROUTINE(S) TO PERFORM CORRECTIVE ACTION(S) PER RECOMMENDATION(S) 337

*FIG. 3*

| EDGE ID 501 | CAUSALITY SOURCE 503 | CAUSALITY DESTINATION 505 | TOLERANCE 507 | SEVERITY 509 | RECOMMENDATION 511 |
|---|---|---|---|---|---|
| 1 | APIGATEWAY:REQUESTRATEINCREASE | SERVERLESSCOMPUTE:INVOCATIONCOUNTINCREASE | 10 MINS | LOW | RECOMMENDATION 1 (CONDITION FOR APPLICABILITY); RECOMMENDATION 2 |
| 2 | SERVERLESSCOMPUTE:INVOCATIONCOUNTINCREASE | MYSQLDB:DBLOADINCREASE | 10 MINS | LOW | |
| 3 | SERVERLESSCOMPUTE:DEPLOYMENT | SERVERLESSCOMPUTE:DURATIONININCREASE | 300 MINS | LOW | |
| 4 | SERVERLESSCOMPUTE:INVOCATIONCOUNTINCREASE | MYSQL:DBLOADINCREASE | 10 MINS | MEDIUM | RECOMMENDATION 2; RECOMMENDATION 4 |
| 5 | SERVERLESSCOMPUTE:THROTTLESINCREASE | APIGATEWAY:ERRORSINCREASE | 300 MINS | LOW | |

*FIG. 5*

| ID 1001 | CAUSALITY SOURCE 1003 | CAUSALITY TARGET 1005 | CAUSALITY TABLE REF 1007 | PROBABLITLY 1009 |
|---|---|---|---|---|
| 1 | APIGATEWAY:APIGATEWAY1:REQUESTRATEINCREASE | SERVERLESSCOMPUTE:SERVERLESSCOMPUTE1:INVOCATIONCOUNTINCREASE | ROW=1 | 1 |
| 2 | SERVERLESSCOMPUTE:SERVERLESSCOMPUTE1:INVOCATIONCOUNTINCREASE | MYSQL:MYSQL1:DBLOADINCREASE | ROW=4 | .5 |

FIG. 10

SYSTEMS, METHODS, AND APPARATUSES FOR DETECTING AND CREATING OPERATION INCIDENTS

BACKGROUND

Web services applications may require considerable investment to configure and subsequently manage. For example, a managing a running web services application may include logging, monitoring, and retaining account activity related to actions across the application's infrastructure.

BRIEF DESCRIPTION OF DRAWINGS

Various embodiments in accordance with the present disclosure will be described with reference to the drawings, in which:

FIG. 2 illustrates an exemplary embodiment of content of an insight knowledgebase that is used to build an insight and insight indication FIG. 3 illustrates an example of a graphical user interface (GUI) showing an insight indication.

FIG. 5 illustrates an exemplary embodiment of content of a causality knowledgebase that is used to build a causality indication.

FIG. 10 illustrates an exemplary embodiment of a causality graph.

DETAILED DESCRIPTION

Figure 1:
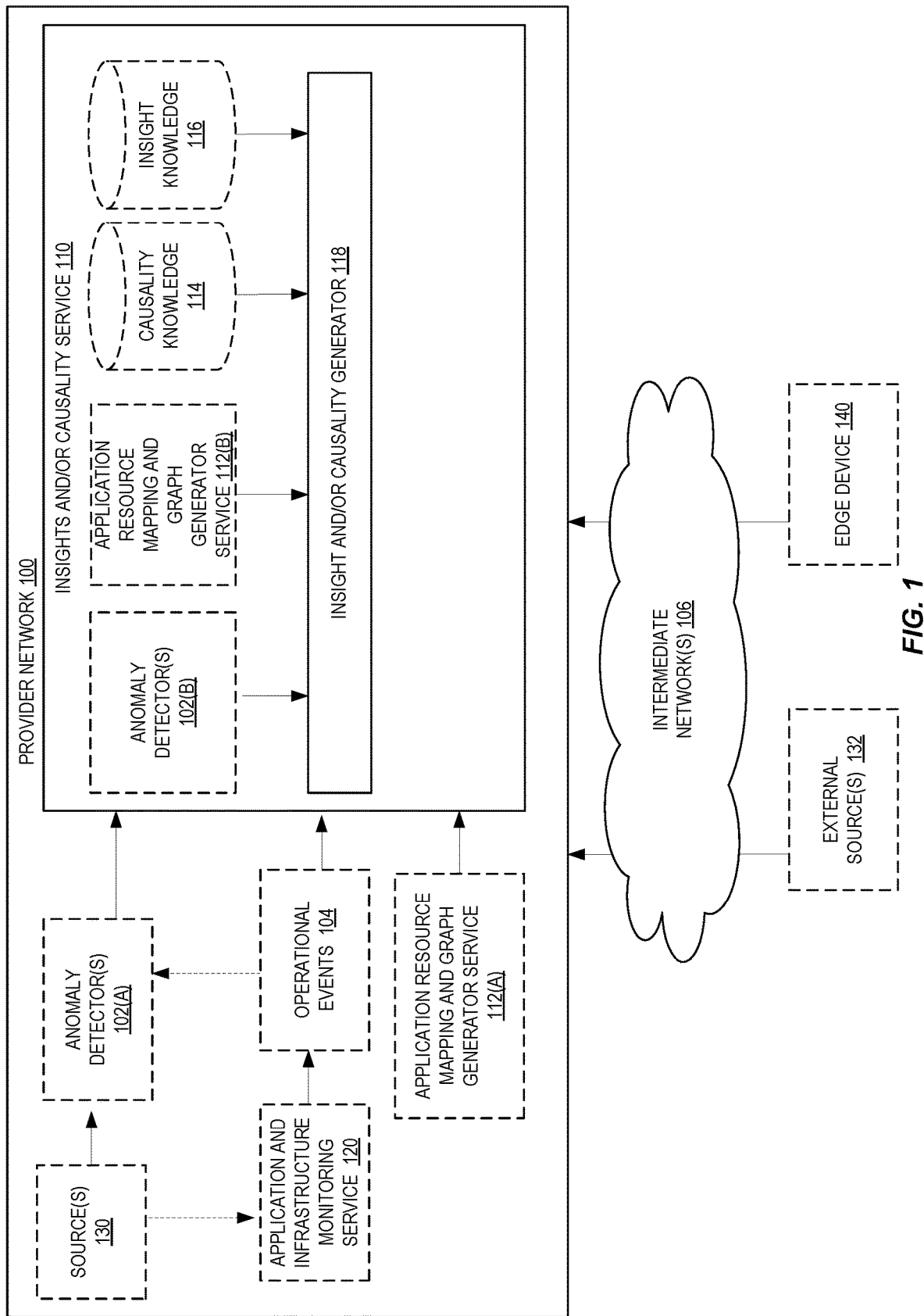
FIG. 1 illustrates embodiments of a system that includes an insights and/or causality service.

The present disclosure relates to methods, apparatus, systems, and non-transitory computer-readable storage media for one or more services to providing insights into application, infrastructure, etc. behavior (e.g., based on metrics, logs, data sources (internal and/or external) events, etc.) and/or causality of behavior in a provider network system. A large service can have multiple ongoing issues at any given time. In particular, one or more services are described which help application disruptions by monitoring application activity to detect operational incidents and risks such as missing alarms, incorrect configuration settings, and/or unusual application behavior according to some embodiments.

In some embodiments, an insight and/or causality service (note that this service may be multiple services, for example, one for insight and one for causality) provides the above functionality. This service (or services—note for ease of understanding and to avoid redundancy only single service will be described herein, however, what is described applies to separate services) uses machine learning to analyze application data, operational metrics, and API calls (for example, API calls as logged) to establish a context of "normal" operating patterns and automatically identifies behavior that falls outside normal. In some embodiments, when the behavior is identified as an operational incident or risk, the service delivers an insight indication representing an insight which includes one or more of a list of anomalies, a list of relevant events, and recommendations (if any). An insight indication is a user visible objective created when the service believes there is an unhealthy state (reactive insight) or an unhealthy state will be entered into the in the future (proactive insight) for a monitored system or application. An insight indication may include with a detailed actionable recommendation on how to remediate at least one issue causing the potentially abnormal behavior. In some embodiments, recommendations are not available, but the issue is flagged for review. In some embodiments, an insight indication includes metric anomalies, events and associated recommendations. A recommendation includes suggested actions for remediation/mitigation of system health issue. A recommendation can be suggested due to a particular anomaly, operational event, or a combination. In some embodiments, a recommendation includes an explanation on why this recommendation was suggested. In some embodiments, recommendations are generated based on domain knowledge.

In some embodiments, the service determines causality to point a user to a cause of the issue by discovering the causality linkages between various anomalies and event that are a part of an insight (which may be include a collection of events or anomalies). An example of a causality linkage is a gateway request rate increase caused an increase in another service's invocation count which then caused a database load to be high. In this case, there are at least two possible root causes: a) someone abusing the service and needs to be throttled and b) the traffic is legitimate and the system was insufficiently scaled. In either case, an immediate mitigation (throttling) is at the root of this causal chain which causality points to.

If available, the service provides recommended resolution possibilities. Continuing the same example, there are two possible recommendations that may be provided: a) throttle calls at gateway and/or b) add capacity in the database. In some embodiments, whenever there are multiple recommendations, the recommendation that is linked to the root of a causal chain is shown as the first prioritized recommendation to bring attention to an immediate action needed.

FIG. 1 illustrates embodiments of a system that includes an insights and/or causality service. The insights and/or causality service 110 the service ingests operational data from one or more sources such as metrics, logs, and events and analyzes them to identify issues when behavior deviates from normal. Metrics are data about the performance of a system or service. Typically, they are reported in form of time series data. Operational events 104 are events that have been analyzed and indexed. Examples of such event include, but are not limited to deployment, an infrastructure change, or a mutating change on a service. In some embodiments, these events are provided by an application and infrastructure monitoring service 120. Note the events may come from internal sources 130 and/or external sources 132. In some embodiments, the infrastructure monitoring service 120 logs, monitors, and retains account activity including management acts, API calls (which may be used, for example, to identify creation, modification, and deletion of resources), etc.

Anomaly detection (internal or external) is performed on input from one or more sources 130 or 132 to filter, annotate and generate significant deviations from normal into user visible objects called anomalies. In some embodiments, an anomaly object includes a name, a type of anomaly (e.g., an upper threshold anomaly, etc.), and a time associated with the anomaly detection. This time may be the start time of the anomalous behavior or an end time of the anomalous behavior. Note that in some embodiments, a separate anomaly event is generated for the start and end of the anomaly. Depending upon the embodiment, the anomaly detection may be performed by one or more anomaly detectors 102(A) that are external to the insights and/or causality service 110 and/or by one or more anomaly detectors 102(B) that are internal to the insights and/or causality service 110. In some embodiments, anomaly detection is based on one of a changepoint, threshold, or missing data.

To determine an insight (and potentially generate an insight indication), the insights and/or causality generator 118 utilizes one or more inputs including one or more of: at least one metric anomaly with type (e.g., MySQL:DBLoad: UpperThreshold implies that upper threshold of the My SQL DBLoad metric has been breached); at least one operational event (e.g., generated by analyzing logs, alarms, etc.), an event/anomaly to application and/or resource mapping (in some embodiments, this is provided by an application resource mapping and graph generator service 112(A) and/or an application resource mapping and graph generator service 112(B)); and/or alarm-ability patterns provided by insight knowledgebase 116 that captures of a certain anomaly or event is alarm-able and, if so, at what severity level. Examples of metric resource types include, but are not limited to a stream, a database, etc. Examples of a metric type include, but are not limited to throttle, request rate, latency, error rate, custom, etc. Metric thresholds may be configured or based on metric domain knowledge (such as Alarm Threshold-upper, Interest Threshold lower, Interest Changepoint, Interest missing values, etc.). The application resource mapping and graph generator service 112(A) or application resource mapping and graph generator service 112(B) generates application and/or resource graphs. In some embodiments, these graphs are generated using application template information.

FIG. 2 illustrates an exemplary embodiment of content of the insight knowledgebase 116 that is used to build an insight and insight indication. As shown, there are a plurality of alarm-ability patterns (one per row). Each pattern includes an identifier of the pattern 201, an event or anomaly 203 that is alarm-able, a severity 205 for the event or anomaly 203 as it applies to the insight and/or evaluated entity, and, when known, a recommendation 207. As such, when the insights and/or causality generator 118 finds a match to a particular event or anomaly 203, a relevant insight and insight indication can be generated. As noted above, that insight indication may include what caused the issue (the event or anomaly 203), how severe that issue is, and what to do about it. In some embodiments, what severities are to be reported is user configurable (e.g., a user may decide to not receive as a part of an insight indication information about a low severity event or anomaly).

An insight indication may include one or more of: a list of anomalies for an application; a list of relevant events (e.g., a configuration change event that is for an anomalous resource is considered related, for example: if a database throttling metric is anomalous and a configuration change for the database table was detected, the event is a related event); and any recommendations matched for a metric or event that is alarm-able. In the example of FIG. 2, if API Gateway errors are anomalous (row 3), a recommendation for how to debug API gateway errors may be provided.

FIG. 3 illustrates an example of a graphical user interface (GUI) showing an insight indication. An insight indication typically includes a name of the insight, a severity (e.g., high, medium, low, etc.) and one more of overview information 300, metric information 310, relevant event information 320, and/or recommendations 330.

Insight overview information 300 may include one or more of a description 301 of the insight, a status of the insight 303 (e.g., resolved or open), a start time 305 and end time 307 of the insight, and what entities are impacted 309. These entities may include stacks, resources, etc.

Metric information 310 may include one or more of a means to search for metrics 311 to allow a user to find what metrics are impacted, a listing of impacted metrics 313 in the insight, and/or a timeline of the impact 315 for each of the metrics. In this example, each impacted metric is shown by its stack, resource type, and particular resource name. This allows a user to more definitely zero in on what is a problem. The timeline shows when the metric was impacted.

Relevant event information 320 may include one or more means to search for events 321 to allow a user to find what events may be involved in the insight (e.g., events that may have caused an anomaly, alarm, etc.), a listing of particular events 323, and/or a timeline of the each of the listed events and their relationship to the insight. Exemplary events include deployment, security changes, etc.

A recommendation 330 may include one or more of a recommendation name 331, text 333 about why the recommendation was made, and a listing of one or more metrics or events 335 that are related to the recommendation. In some embodiments, the recommendation 330 includes a means to execute one or more routines to perform one or more corrective actions according to the recommendation that can be engaged using field 337. For example, a runbook may be executed. Runbooks may be user provided (and searched for a match) and/or provided by the provider network based on domain or user knowledge.

Figure 4:
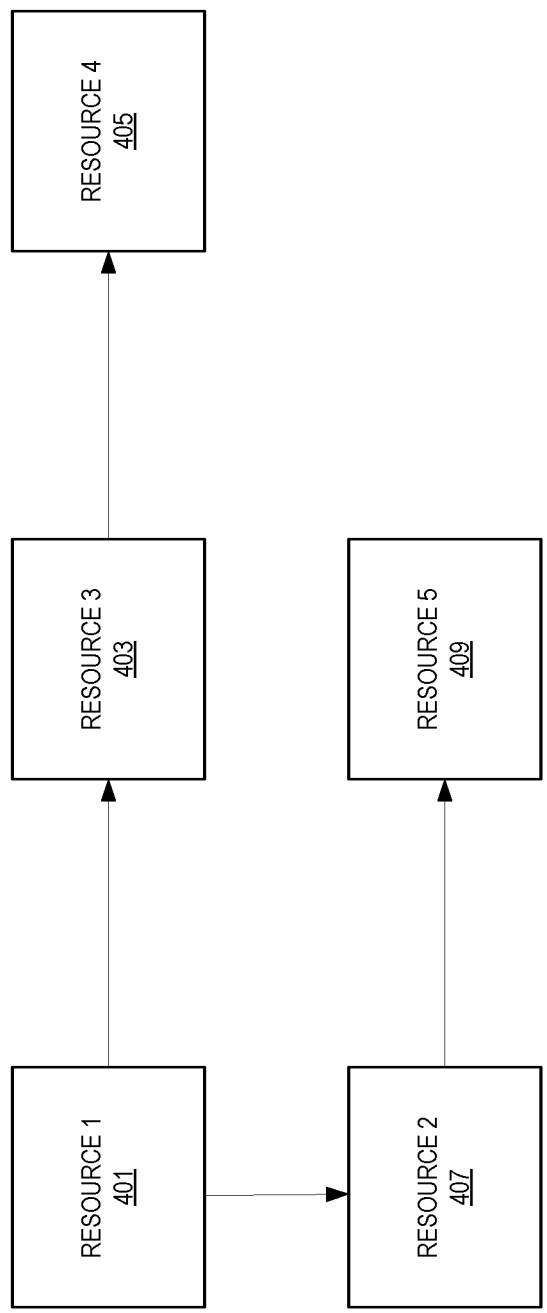
FIG. 4 illustrates an exemplary application graph.

A causality indicates that one act caused another act within an insight. FIG. 4 illustrates an example of a system as mapped. Resource 1 401 can impact resource 3 403 and resource 2 407. Resource 3 403 in turn can impact resource 4 405 and resource 2 407 can impact resource 5 409.

If, for example, resource 1 401 gets a high request rate for writes to create new objects and that causes resource 3 403 to increase a number of calls to resource 4 405 which causes resource 4 405 to slow down, there is a causal link from resource 1 401 to resource 4 405. However, that causal link may not be known by just looking at resource 3 403 and resource 4 405. Similarly, if resource 1 401 gets a high request rate for writes to create new objects and that causes resource 2 407 to increase a number of calls to resource 5 409 which causes resource 5 409 to slow down, there is a causal link from resource 1 401 to resource 5 409. In either scenario, it is clear that resource 1 401 has started a causal chain reaction that needs to be addressed.

To determine causality (and potentially generate a causality indication), the insights and/or causality generator 118 utilizes one or more inputs including one or more of: at least one metric anomaly with type (e.g., MySQL:DBLoad:UpperThreshold implies that upper threshold (anomaly type) of MySQL (resource), DBLoad (metric) has been breached); at least one operational event (e.g., generated by analyzing logs, alarms, etc.), an event/anomaly to application and/or resource mapping (in some embodiments, this is provided by an application resource mapping and graph generator service 112(A) and/or an application resource mapping and graph generator service 112(B)); and/or alarm-ability patterns provided by a causality knowledgebase 114 that captures information on probable causality between metrics and events.

The output of the insights and/or causality generator 118 with respect to causality is a set of events that are connected (A caused B) and, if available, a reason about the causal order of these events.

In some embodiments, the web application utilizes a stack which is a collection of provider network resources that can be managed together. A stack, for instance, can include all the resources required to run a web application, such as a web server, a database, and networking rules.

In some embodiments, the resource mapping may be in the form of an application graph such as shown in FIG. 4 and may be formed by analyzing a web application template in some embodiments. For example, in some embodiments, the application resource mapping and graph generator service 112(A) and/or the application resource mapping and graph generator service 112(B)) generates this graph. In other embodiments, the graph is provided by the application creator.

In some embodiments, the causality knowledgebase 114 is a graph that captures information on probably causality between metrics and events. A causality knowledge graph may be stored as a list of edges of the following form: RESOURCE1:METRIC1:ANOMALY TYPE1→RESOURCE2:METRIC2:ANOMALY TYPE2 where→implies a potential impact for the first edge to the second edge. Note that a first resource may impact the same metric and/or anomaly type of a second resource.

FIG. 5 illustrates an exemplary embodiment of content of the causality knowledgebase 114 that is used to build a causality indication. In this example, an edge list is stored as the table (however, other data structures may be used). In addition to causal edges, the causality knowledgebase 114 also stores patterns for alarm-able events. These are anomalies which should create insights even when there is not causality information. An example of such an anomaly is a MySQL DBLoad increase which is critical enough to inform a user.

Each pattern includes an edge ID 501, a causality source 503, a causality destination 505, a severity 509 as it applies to the causality and/or evaluated entity, and, when known, a recommendation 511. As such, when the insights and/or causality generator 118 finds a causality match to a particular set of events or anomalies, a causality indication can be generated. Recommendations are also provided to the user along with causal reasoning when present. In some embodiments, the recommendation includes a condition for applicability). In some embodiments, a pattern also includes a tolerance 507 value that may be used to ensure the timing of any match is correct. Note that a tolerance value to use may also be a default value.

The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Figure 6:
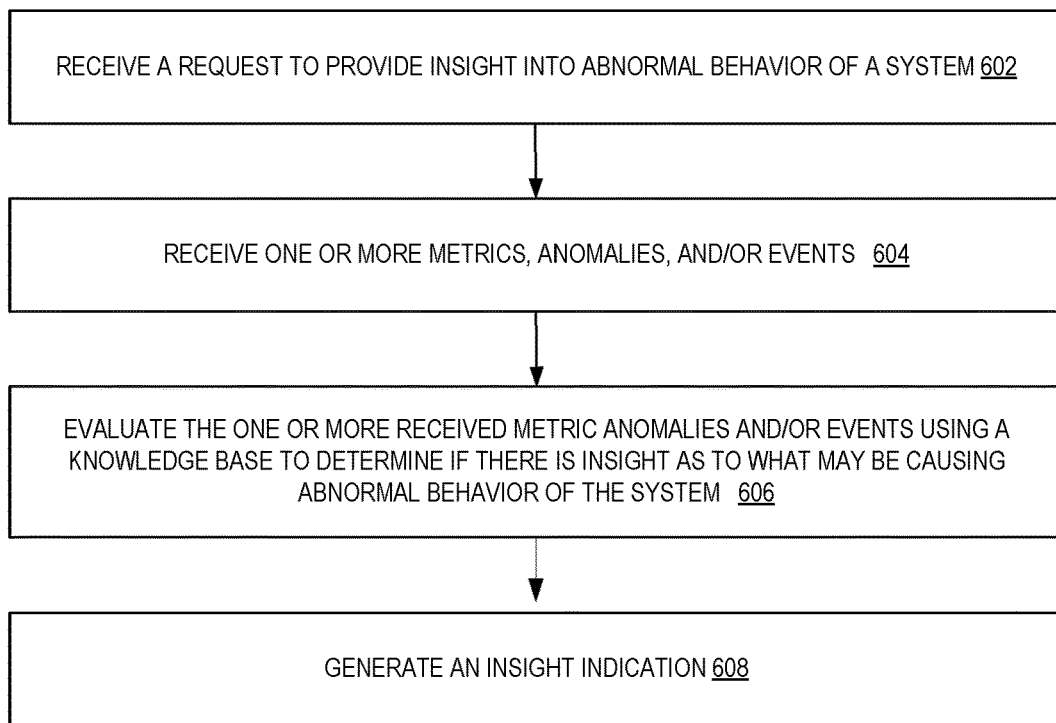
FIG. 6 is a flow diagram illustrating operations of a method for potential insight indication generation according to some embodiments.

FIG. 6 is a flow diagram illustrating operations of a method for potential insight indication generation according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by insights and/or causality service 110 of the other figures.

At 602, a request to provide insight into detected abnormal behavior of a system is received. This request may include one or more of: an indication of a system to evaluate (e.g., an indication of an application (and associated resources), set of applications (and associated resources), stack, resources, infrastructure, etc.); an indication of anomaly detection to use; a configuration of an anomaly detector; a location of a web services configuration (e.g., to have a mapping made); an indication of a causality knowledgebase to use; an indication of an insight knowledgebase to use; etc. This request is used to configure the operation of the insights and/or causality service 110.

One or more of metrics, operational events, and/or anomalies and/or events are received at 604. For example, an anomaly associated with a threshold being violated or an event such as an alarm being generated is received. In some embodiments, metrics are evaluated with an anomaly detector prior to this receiving. In some embodiments, anomalies are generated as a part of this act.

The one or more received metrics, anomalies, and/or events are evaluated using a knowledge base to determine if there is insight as to what may be causing abnormal behavior of the system as indicated by the anomaly and/or event at 606. In some simple scenarios, this evaluation is simply a query of the insight knowledgebase to try to find a match. The evaluation provides at least a severity, but may also include a recommendation.

At 608, an insight indication is generated (and in some instances provided as a part of a GUI when requested). As shown earlier, an insight indication may include one or more of: information about a recommendation, why the recommendation was recommended, metrics related to the recommendation, a status of the insight, a severity of the insight, entities that are affected, a start and a stop time for the insight (e.g., when there was an impact), a listing of impacted metrics, timing information of the impact of the event or anomaly, relevant events, timing of the relevant events with respect to the insight, etc. In some embodiments, an insight is considered closed when all alarm-able events in the insight are closed. In some embodiments, an insight is considered closed when all of the anomalies of the insight have an "end" indication.

Figure 7:
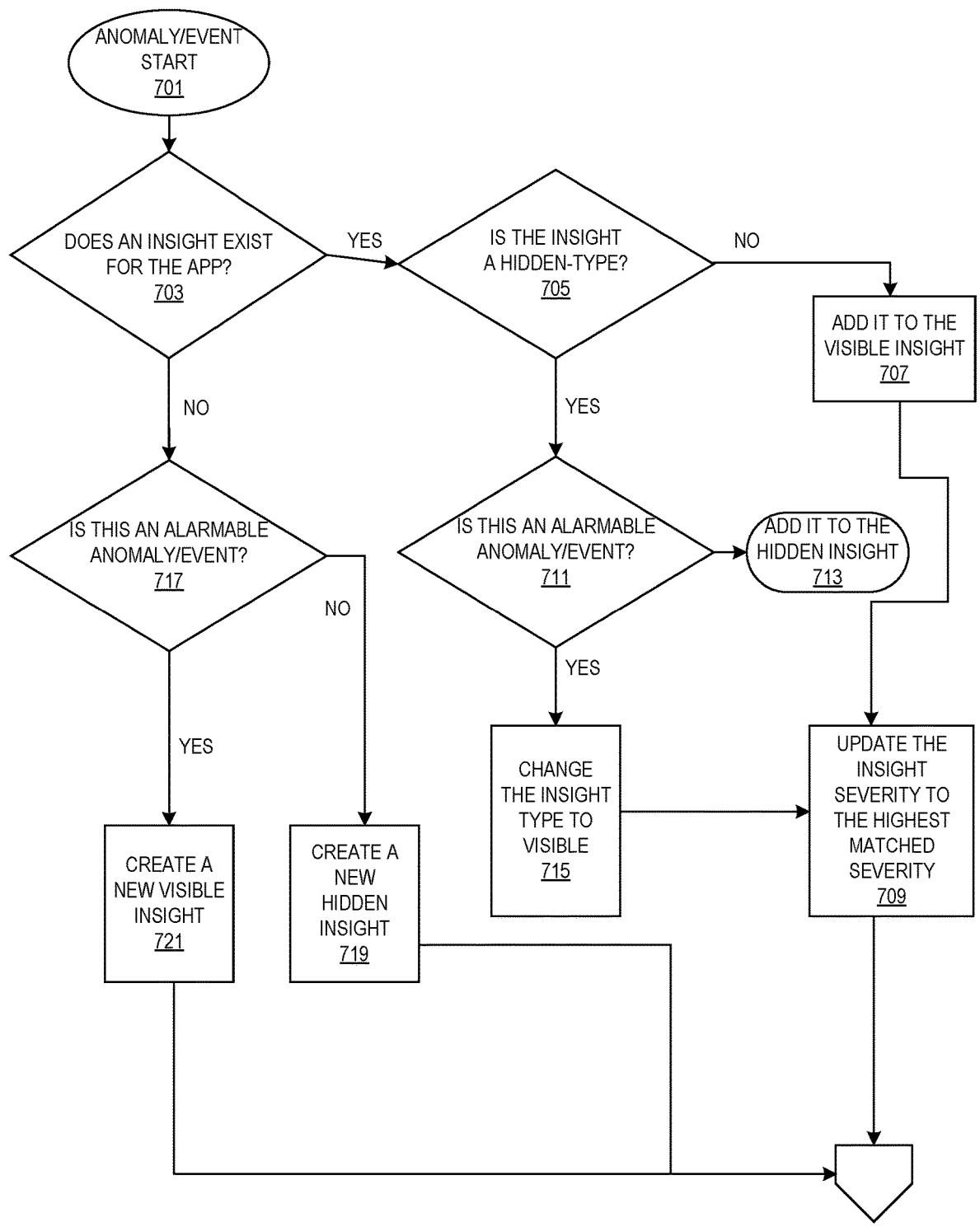
FIG. 7 is a flow diagram illustrating operations of a method for an evaluation of an anomaly or according to some embodiments.

FIG. 7 is a flow diagram illustrating operations of a method for an evaluation of an anomaly or according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by insights and/or causality service 110 of the other figures.

In this flow, it is presumed that anomaly detection has been performed. At 701, an anomaly or event start indication is received. That is there is an anomaly or event that may be impacting the system as of time X.

A determination of if there is an existing insight for the system (here an application) is made at 703. In other words, is there an ongoing insight for this application already open such that the new anomaly or event is to be added to that insight?

If there is not an existing insight, then a determination is made of if the anomaly or event is alarm-able is made at 717. For example, is there a match in the insight knowledgebase? When the anomaly or event is not alarm-able, then a new "hidden" insight is created at 719. A hidden insight means that there is not something yet regarding the application to generate an alarm, but that should be tracked. When the anomaly or event is not alarm-able, then a "visible" insight is created at 721. Note that this may not mean that an insight indication is generated, but may mean that an insight indication could be generated. Typically, an insight indication is generated on demand.

If there is an existing insight at 703, a determination is made of if the insight is hidden at 705. When the insight is not hidden, the anomaly or event is added to the insight at 707 and the insight is updated to the highest matched severity at 709. In other words, the insight indication, when displayed, will show the highest matched severity of all of the anomalies or events within the insight.

When the insight is hidden, a determination of if the anomaly or event is alarm-able is made at 711. For example, is there a match in the insight knowledgebase? When the anomaly or event is not alarm-able, then the anomaly or event is added to the hidden insight at 713. When the anomaly or event is alarm-able, then the anomaly or event is added to the hidden insight and the hidden insight made visible at 713.

Figure 8:
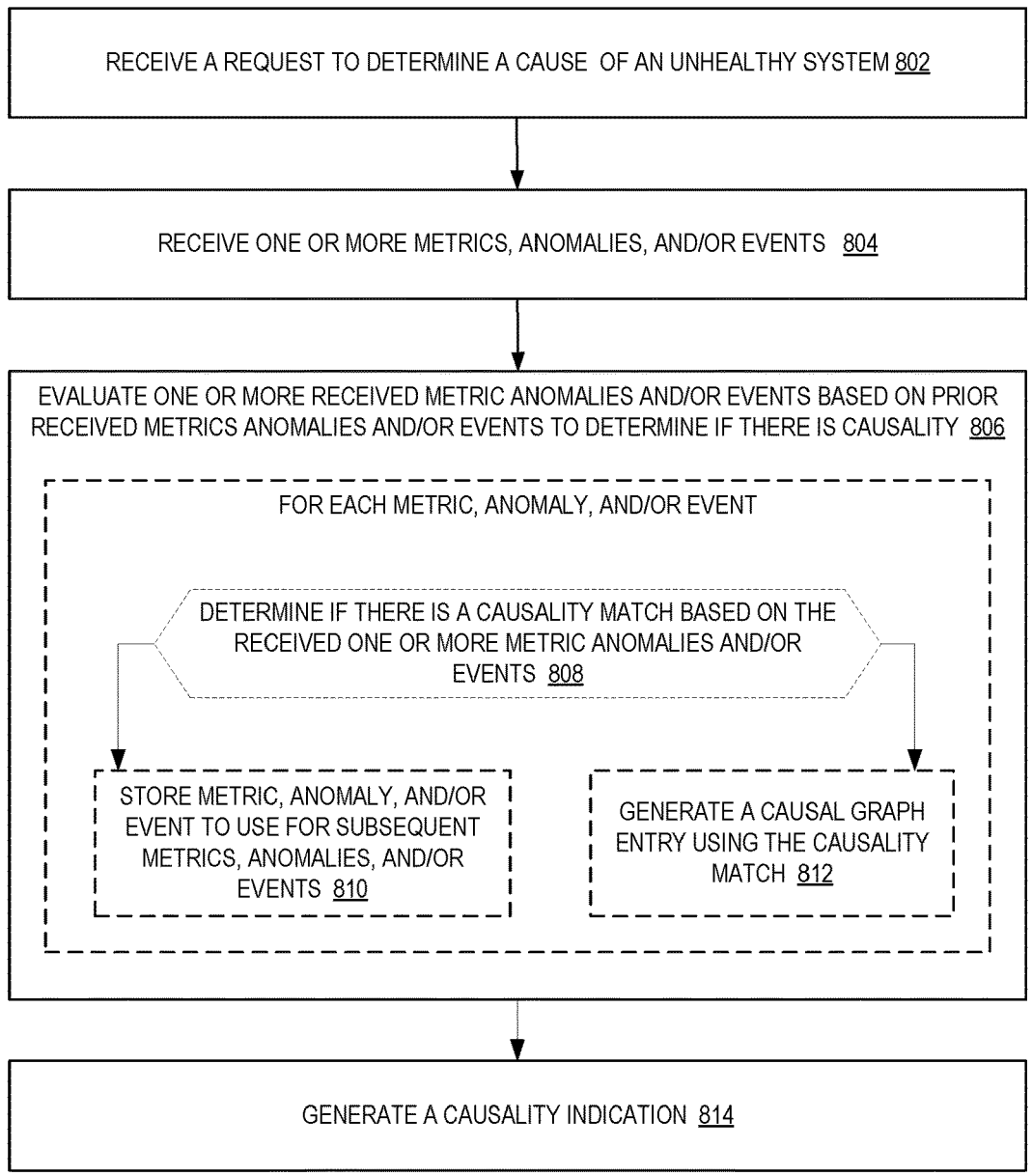
FIG. 8 is a flow diagram illustrating operations of a method for determining causality according to some embodiments.

FIG. 8 is a flow diagram illustrating operations of a method for determining causality according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by insights and/or causality service 110 of the other figures.

At 802, a request to determine a cause of an unhealthy system is received. This request may include one or more of: an indication of a system to evaluate (e.g., an indication of an application (and associated resources), set of applications (and associated resources), stack, resources, infrastructure, etc.); an indication of anomaly detection to use; a configuration of an anomaly detector; a location of a web services configuration (e.g., to have a mapping made); an application graph or location of an application graph; an indication of a causality knowledgebase to use; an indication of an insight knowledgebase to use; etc. This request is used to configure the operation of the insights and/or causality service 110.

One or more of metrics, operational events, and/or anomalies and/or events are received at 804. For example, an anomaly associated with a threshold being violated or an event such as an alarm being generated is received. In some embodiments, metrics are evaluated with an anomaly detector prior to this receiving. In some embodiments, anomalies are generated as a part of this act.

At 806, an evaluation of one or more of the received metrics, anomalies, and/or events is made based on prior received metrics, anomalies, and/or events to determine if there is causality. This evaluation may include evaluation of several acts to be performed for each received metric, anomaly, or event. In some embodiments, a determination of if there is a causality match based on the received one or more metrics, anomalies, and/or events is made at 808. For example, is there a match in the causality knowledge graph between a source and a destination?

When there is a causality match, then a causality graph entry is made using the causality match at 812. For example, the causality source, causality target, severity, and recommendation (if available) are placed into the causality graph. FIG. 10 illustrates an exemplary embodiment of a causality graph. As shown, a causality graph utilizes information from the causal knowledgebase, but in a more particular manner. In particular, for each identified 1001 match, the causality graph includes specific details of the causality source 1003 and causality target 1005, and a recommendation from the knowledge graph (or pointer to it) 1007. In this illustration, the particular gateway (APIGATEWAY1) is shown for the causality source of the first identified match and a particular Lambda function (LAMBDA1) is shown for the causality target. Additionally, the metric, anomaly, and/or event is stored for use for subsequent metrics, anomalies, and/or events causal evaluations. In some embodiments, the causality includes a probability value 1009 of the match.

When there is not a causality match, the metric, anomaly, and/or event is stored to use for subsequent metric, anomaly, and/or event causal evaluations at 810.

At 814, a causality indication is generated. A causality indication typically includes the edges of the causality graph (e.g., the source and destination impacted, a severity of the issue, and a recommendation (when available). A causality indication may take several forms including, but not limited to: an application graph with matched edges highlighted (e.g., colored differently, flashing, badged, etc.) along with a means to see a recommendation and severity; a textual representation (e.g., A→B) along with a means to see a recommendation and severity; etc.

Figure 9:
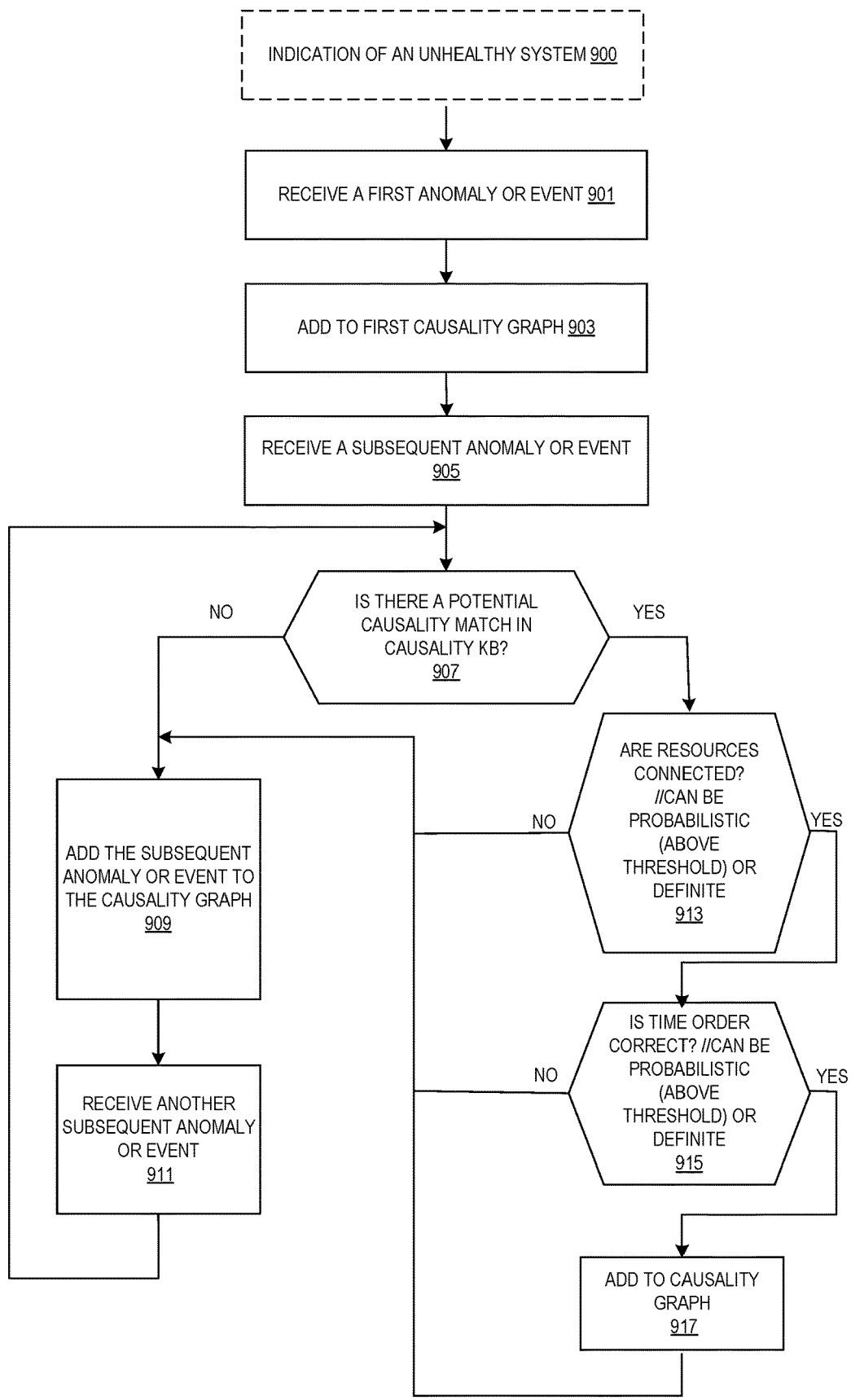
FIG. 9 is a flow diagram illustrating operations of a method for determining when there is a causality match according to some embodiments.

FIG. 9 is a flow diagram illustrating operations of a method for determining when there is a causality match according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by insights and/or causality service 110 of the other figures.

In some embodiments, at 900 an indication of if a system is unhealthy is received.

At 901, a first anomaly or event is received. This anomaly or event is added to an insight at 903. A subsequent anomaly or event is received at 905.

A determination of if there is there a potential causality match in the causality knowledgebase is made at 907. In other words, is there a tuple that matches subsequent anomaly or event and a previous anomaly or event? If not, then the subsequent anomaly or event is added to the insight at 909. At some later point another subsequent anomaly or event is received at 911 and a new evaluation is made.

When there is a potential causal match, a determination of if the resources are connected is made at 913. For example, in the application graph is there a link between the resources of the present anomaly or event and a matching previous anomaly or event? In some embodiments, this determination is definite (as in resource connectivity is known). In some embodiments, this determination is probabilistic (as in a probability of resources being connected) and when the probability is above a threshold then the resources are deemed connected. In some embodiments, both definite and probabilistic determinations are used.

If not, then the subsequent anomaly or event is added to the insight at 909. If the resources are connected, a determination if the time order of anomalies or events is correct is made at 915. When the current event or anomaly happens within a tolerance for the causal match, it is considered a match. When the current event or anomaly happens outside of the tolerance, a check is made of if the current event or anomaly happened before or after the match. If the current event or anomaly happened after the other event or anomaly, this is not a match. If current event or anomaly happened before the other event or anomaly AND (other event or anomaly—current event or anomaly)<a tolerance for the event match, it is a match otherwise it is not. In some embodiments, this determination is definite (as in timing is known). In some embodiments, this determination is probabilistic (as in a probability of timing being satisfied) and when the probability is above a threshold then the timing is deemed satisfied. In some embodiments, both definite and probabilistic determinations are used.

When there is a match, it is added to the causality graph at 917.

Figure 11:
FIG. 11 illustrates embodiments of a graphical representation of a causality graph.

In some embodiments, the recommendations have priority. In some embodiments, the priority is determined by analyzing the causality graph to find the nodes which are the sources of the causal matches. Example, if the graph is A→B→C→D, then the source is A. In this case recommendations which match A or A→B causal pattern are shown first. If there are multiple source matches, the recommendations are prioritized in time order of the source match with earliest match first. Any remaining recommendations are ordered by the time order of the source of the causal match. Example: if there is a recommendation for F→G and H→I and Ftime<Htime, a recommendation matching F→G is shown before H→I. Other priorities may include one or more of severity and probability. FIG. 11 illustrates embodiments of a graphical representation of a causality graph. As shown, the request rate increase of the APIGatway 1 caused an invocationcountincrease of the serverlesscompute node 1 which caused an DBloadincrease of the MySQL node 1.

Figure 12:
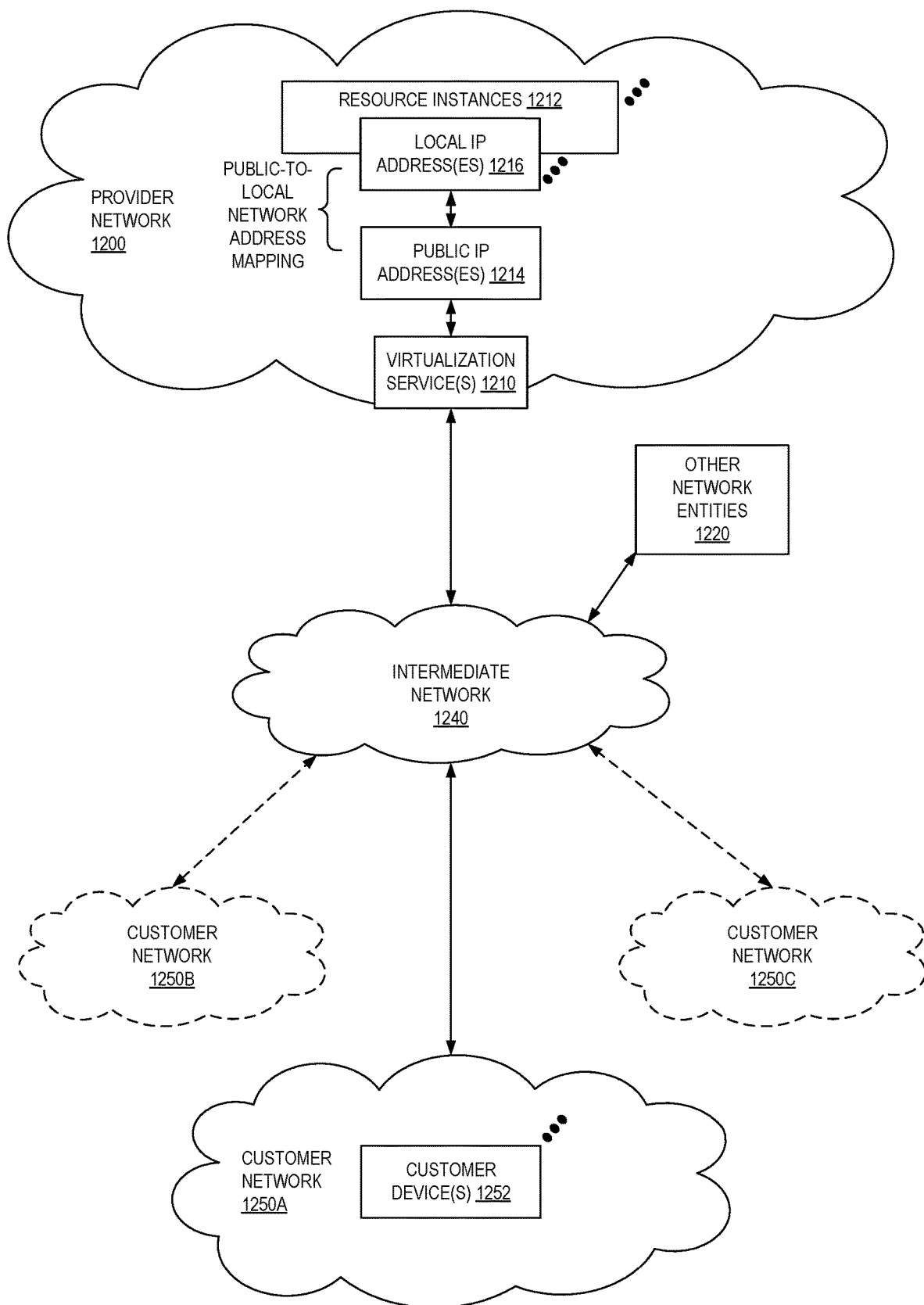
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
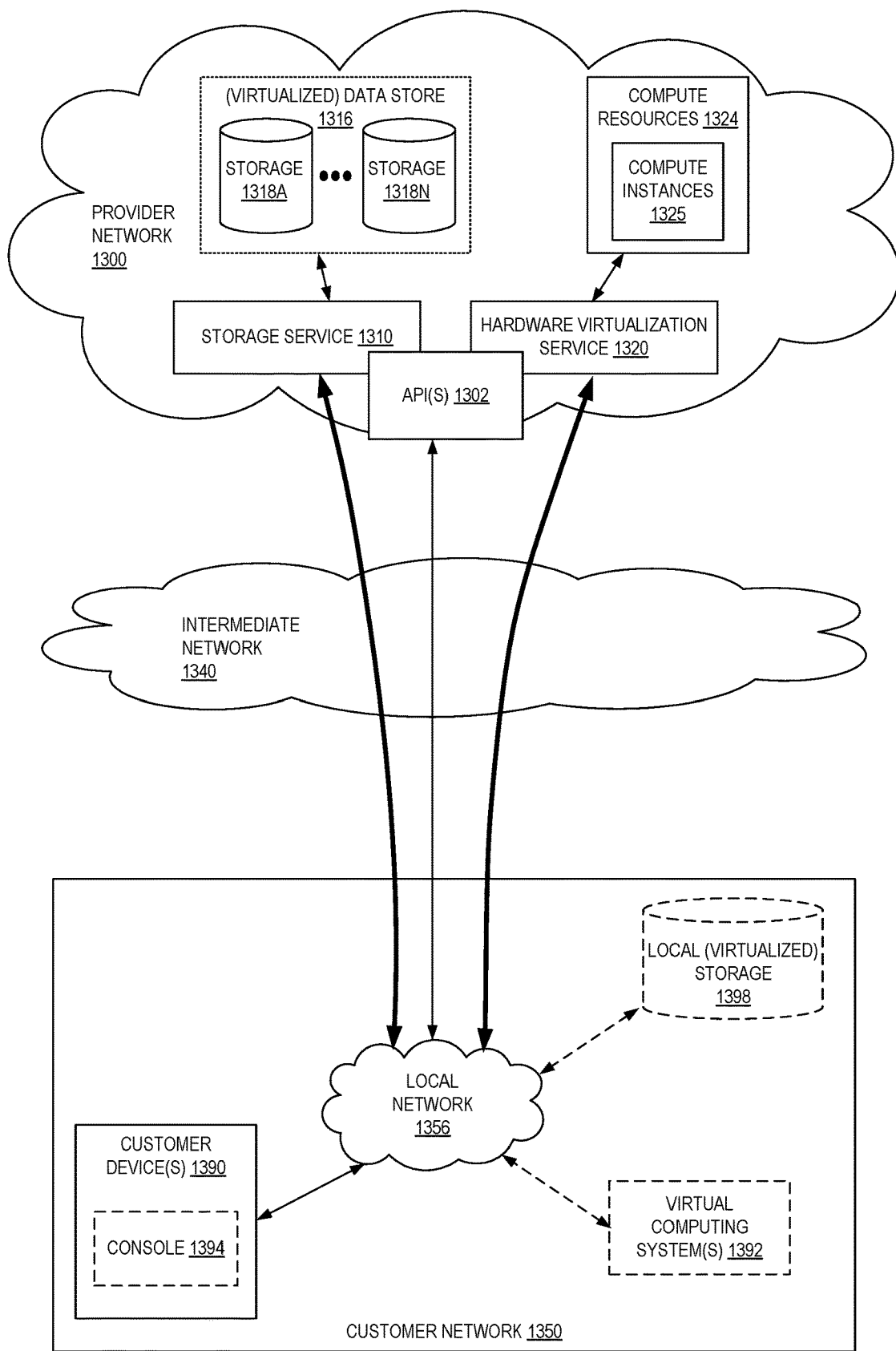
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple compute resources 1324 (e.g., compute instances 1325 such as VMs) to customers. The compute resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the compute resources 1324 to public Internet destinations, and from public Internet sources to the local IP addresses of compute resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative Systems

Figure 14:
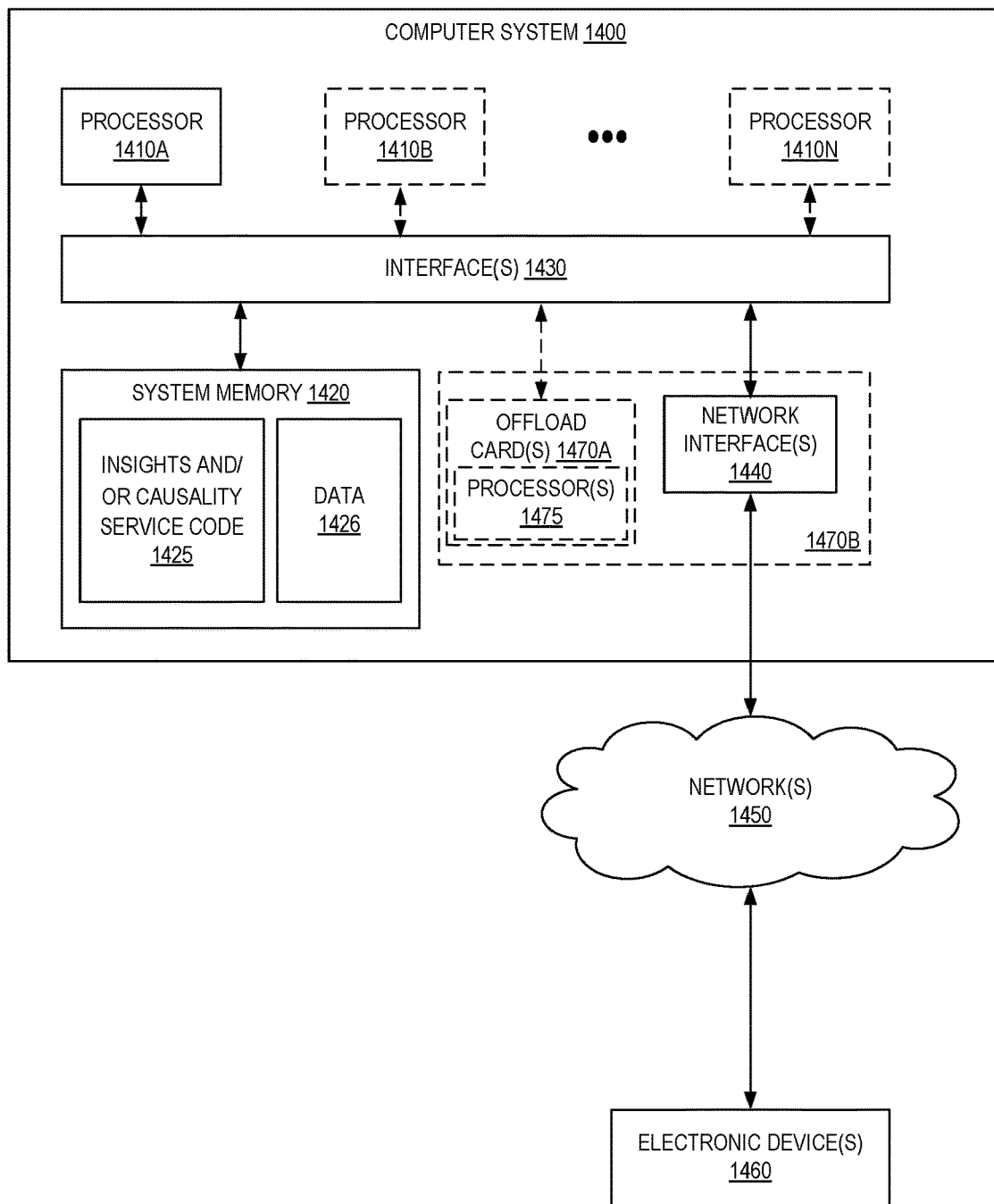
FIG. 14 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as insights and/or causality service code 1425 (e.g., executable to implement, in whole or in part, the insights and/or causality service 110) and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470A or 1470B (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some embodiments the offload card(s) 1470A or 1470B can perform compute instance management operations such as pausing and/or un-pausing compute instances, launching and/or terminating compute instances, performing memory transfer/copying operations, etc. These management operations may, in some embodiments, be performed by the offload card(s) 1470A or 1470B in coordination with a hypervisor (e.g., upon a request from a hypervisor) that is executed by the other processors 1410A-1410N of the computer system 1400. However, in some embodiments the virtualization manager implemented by the offload card(s) 1470A or 1470B can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to provide insight into potential abnormal behavior of an application;
receiving information associated with an anomaly or event associated with the potential abnormal behavior;
evaluating the information associated with the anomaly or event associated with the potential abnormal behavior;
determining, based at least in part on the evaluating, there is an ongoing insight for the application as to what is causing the potential abnormal behavior, the ongoing insight already open in an insight knowledgebase such that the potential abnormal behavior is to be added to the ongoing insight, the determining comprising:
  querying the insight knowledgebase;
  finding a match in the insight knowledgebase for the information associated with the anomaly or event associated with the potential abnormal behavior; and
  adding to the ongoing insight in the insight knowledgebase at least one of an indication of a metric involved in the potential abnormal behavior, a severity for the indication of the metric involved in the potential abnormal behavior, an indication of a relevant event involved in the potential abnormal behavior, and a recommendation on how to cure the potential abnormal behavior;
determining there is a causality match in a causality knowledgebase between the anomaly or event associated with the potential abnormal behavior and another anomaly or event, the determining comprising:
  determining the anomaly or event happened before the another anomaly or event; and
  determining the anomaly or event happened within a tolerance for the causality match;
adding the causality match to a causality graph; and
providing an insight indication for the ongoing insight via a graphical user interface, the insight indication including a cause of the potential abnormal behavior.

2. The computer-implemented method of claim 1, wherein the information associated with the anomaly or event associated with the potential abnormal behavior is for an abnormality involving at least one of a changepoint, threshold, or missing data.

3. The computer-implemented method of claim 1, wherein the request includes one or more of: an indication of a set of applications to evaluate, an indication of a stack to evaluate, an indication of a set of resources to evaluate, an indication of an infrastructure to evaluate, an indication of anomaly detection to use, a configuration of an anomaly detector, a location of a web services configuration, or an indication of the insight knowledgebase to use.

4. The computer-implemented method of claim 1, further comprising determining that the ongoing insight in the insight knowledgebase is a hidden ongoing insight, such that there is not yet a reason to generate an alarm.

5. The computer-implemented method of claim 4, further comprising:
  determining that the potential abnormal behavior is alarm-able; and
  making visible the hidden ongoing insight in the insight knowledgebase.

6. A computer-implemented method comprising:
  receiving a request to provide insight into potential abnormal behavior;
  receiving information associated with an anomaly or event associated with the potential abnormal behavior;
  evaluating the information associated with the anomaly or event associated with the potential abnormal behavior;
  determining, based at least in part on the evaluating, there is an ongoing insight for the application as to what is causing the potential abnormal behavior, the ongoing insight already open in an insight knowledgebase such that the potential abnormal behavior is to be added to the ongoing insight;
  adding to the ongoing insight in the insight knowledgebase at least two of an indication of a metric involved in the potential abnormal behavior, a severity for the indication of the metric involved in the potential abnormal behavior, an indication of a relevant event involved in the potential abnormal behavior, and a recommendation on how to cure the potential abnormal behavior;
  determining there is a causality match in a causality knowledgebase between the anomaly or event associated with the potential abnormal behavior and another anomaly or event, the determining comprising:
    determining the anomaly or event happened before the another anomaly or event; and
    determining the anomaly or event happened within a tolerance for the causality match;
  adding the causality match to a causality graph; and
  providing an insight indication for the ongoing insight, the insight indication including a cause of the potential abnormal behavior.

7. The computer-implemented method of claim 6, wherein the information associated with the anomaly or event associated with the potential abnormal behavior is for an abnormality involving at least one of a changepoint, threshold, or missing data.

8. The computer-implemented method of claim 7, further comprising performing anomaly detection on a metric to generate the information associated with the anomaly or event associated with the potential abnormal behavior.

9. The computer-implemented method of claim 6, wherein evaluating the information associated with the anomaly or event associated with the potential abnormal behavior comprises querying the insight knowledgebase to try to find a match for the one or more of anomaly information or event information associated with the potential abnormal behavior.

10. The computer-implemented method of claim 9, wherein the insight knowledgebase comprises a plurality of entries, each entry representing an alarm-able pattern including an identifier of the pattern, an indicator of an event or anomaly that is alarm-able, and a severity for the event or anomaly.

11. The computer-implemented method of claim 10, wherein at least a subset of the plurality of entries include a recommendation of how to cure the event or anomaly.

12. The computer-implemented method of claim 6, wherein the recommendation includes text about the recommendation that was made, information about how to cure the potential abnormal behavior, and a listing of any metrics or events associated with the recommendation.

13. The computer-implemented method of claim 6, wherein the insight indication further comprises at least one timeline showing an impact of a particular metric or event.

14. The computer-implemented method of claim 6, wherein the request includes one or more of: an indication of a set of applications to evaluate, an indication of a stack to evaluate, an indication of a set of resources to evaluate, an indication of an infrastructure to evaluate, an indication of anomaly detection to use, a configuration of an anomaly detector, a location of a web services configuration, or an indication of the insight knowledgebase to use.

15. The computer-implemented method of claim 6, wherein the ongoing insight is closed when all alarm-able events in the ongoing insight are closed, or when all anomalies of the ongoing insight have an end indication, or when all alarm-able anomalies of the ongoing insight have an end indication.

16. A system comprising:
  a first one or more electronic devices to implement execution of applications in a multi-tenant provider network; and
  a second one or more electronic devices to implement an insight service in the multi-tenant provider network, the insight service including instructions that upon execution cause the insight service to:
receive a request to provide insight into potential abnormal behavior of an application or dataset;
receive information associated with an anomaly or event associated with the potential abnormal behavior;
evaluate the information associated with the anomaly or event associated with the potential abnormal behavior;
determine, based at least in part on the evaluating, there is an ongoing insight for the application as to what is causing the potential abnormal behavior, the ongoing insight already open in an insight knowledgebase such that the potential abnormal behavior is to be added to the ongoing insight;
add to the ongoing insight in the insight knowledgebase at least two of an indication of a metric involved in the potential abnormal behavior, a severity for the indication of the metric involved in the potential abnormal behavior, an indication of a relevant event involved in the potential abnormal behavior, and a recommendation on how to cure the potential abnormal behavior;
determine there is a causality match in a causality knowledgebase between the anomaly or event associated with the potential abnormal behavior and another anomaly or event, the determining comprising:
determining the anomaly or event happened before the another anomaly or event; and
determining the anomaly or event happened within a tolerance for the causality match;
add the causality match to a causality graph; and
provide an insight indication for the ongoing insight, the insight indication including a cause of the potential abnormal behavior.

17. The system of claim 16, wherein the information associated with the anomaly or event associated with the potential abnormal behavior is for an abnormality involving at least one of a changepoint, threshold, or missing data.

18. The system of claim 16, wherein the recommendation includes text about the recommendation that was made, information about how to cure the potential abnormal behavior, and a listing of any metrics or events associated with the recommendation.

19. The system of claim 16, wherein the insight indication further comprises at least one timeline showing an impact of a particular metric or event.

20. The system of claim 16, wherein the request includes one or more of: an indication of a set of applications to evaluate, an indication of a stack to evaluate, an indication of a set of resources to evaluate, an indication of an infrastructure to evaluate, an indication of anomaly detection to use, a configuration of an anomaly detector, a location of a web services configuration, or an indication of the insight knowledgebase to use.

* * * * *